Nov. 17, 1931.  J. H. ASHBAUGH  1,832,609
REGULATOR SYSTEM
Filed July 22, 1929   3 Sheets-Sheet 1

INVENTOR
John H. Ashbaugh
BY
Eberley S. Carr
ATTORNEY

Nov. 17, 1931.  J. H. ASHBAUGH  1,832,609
REGULATOR SYSTEM
Filed July 22, 1929   3 Sheets-Sheet 3

INVENTOR
John H. Ashbaugh
BY
ATTORNEY

Patented Nov. 17, 1931

1,832,609

UNITED STATES PATENT OFFICE

JOHN H. ASHBAUGH, OF PITTSBURGH, PENNSYLVANIA, ASSIGNOR TO WESTINGHOUSE ELECTRIC & MANUFACTURING COMPANY, A CORPORATION OF PENNSYLVANIA

REGULATOR SYSTEM

Application filed July 22, 1929. Serial No. 380,034.

My invention relates to regulator systems, and more particularly to a regulator system having a regulating element of limited range that is prompt and accurate in its action and an auxiliary regulating element that is operative to extend the range of operation of the first regulating element.

Many types of regulators have been utilized for automatically controlling the field excitation of dynamo-electric machines for regulating the voltage of generators or the speed of motors.

The motor-operated rheostatic type of regulator, wherein resistance is inserted into, or removed from, the field-winding circuit in a series of steps, has been employed, but has certain limitations. The operation of such a regulator is sluggish, on account of the auxiliary equipment which must be operated in order to actuate the contact arm of the rheostat, and it causes the variation in field excitation to take place in definite steps rather than gradually. It has the advantage, however, of controlling a wide range of resistance values.

It is frequently desirable to use a regulator of a type that is accurate and quick in its operation. Such regulators are, however, frequently limited in their range of operation. In the carbon-pile type of regulator for example, a rheostat is used comprising carbon or graphite disc wafers, connected in series circuit relation. The pressure on the pile of discs determines the resistance of the series of wafers, and may be varied by means of a solenoid acting against a spring, the pressure on the pile being a function of the pull of the solenoid. The solenoid is energized in accordance with the characteristic of the machine to be regulated.

The carbon-pile regulator is particularly well adapted for the regulation of small machines, or of large machines where the regulation needed is over a comparatively small range. For large machines, requiring a large range of resistance values, the size of carbon pile required would be very large and bulky, and it would be difficult to obtain satisfactory operation. It is, therefore, desirable to increase the range of operation of the regulating system, beyond that of satisfactory operation of the quick-acting regulator, and at the same time retain the close regulation obtained with such a regulator.

One object of my invention is to provide a regulator of the above-indicated character wherein the range of operation of a quick acting regulator is increased.

Another object of my invention is to provide a regulator of the above-indicated character in which means are provided for preventing the regulator from hunting.

A further object of my invention is to provide means for preventing any change in the value of the resistance inserted in the field circuit of a dynamo-electric machine when the regulated machine is not in operation.

I propose to utilize a carbon-pile rheostat for governing the excitation of the field winding of a dynamo-electric machine over a certain range of resistance values. When the carbon-pile rheostat reaches the limit of its range of operation, a circuit will be completed to actuate a motor-operated rheostat for inserting resistance into or removing resistance from the field winding circuit, until the resistance of the circuit is such that the carbon-pile rheostat is again operating within its range.

My invention may be utilized for governing the speed of a motor, and is hereinafter illustrated and described as having such application. It will, however, be obvious that my system is not limited to this application, but may be utilized to control other characteristics of a dynamo-electric machine, such as the voltage of a generator.

In a regulator system constructed in accordance with my invention, a motor 3 whose speed is to be regulated is supplied with energy from a generator 2 and drives a pilot generator 4 that generates a voltage proportional to the speed of the motor 3. In order to control the speed of the motor 3 a regulator 5 is provided for varying the excitation of the generator 2 in accordance with speed changes of the motor 3.

The regulator 5 is energized by the pilot generator 4 and controls the operation of a carbon-pile rheostat 6 for effecting fine variations in the resistance of the generator field circuit, and, as the change in the value of rheostat 6 approaches the end of its operative range, causes the operation of a rheostat 7 in a direction to restore the rheostat 6 to a value near the central portion of its range.

The carbon-pile rheostat is the primary means for regulating the field excitation, the motor-operated rheostat being employed to increase the range of variation of the generator field excitation.

My invention may be best understood by reference to the following description and to the accompanying drawings in which.

Figure 1:
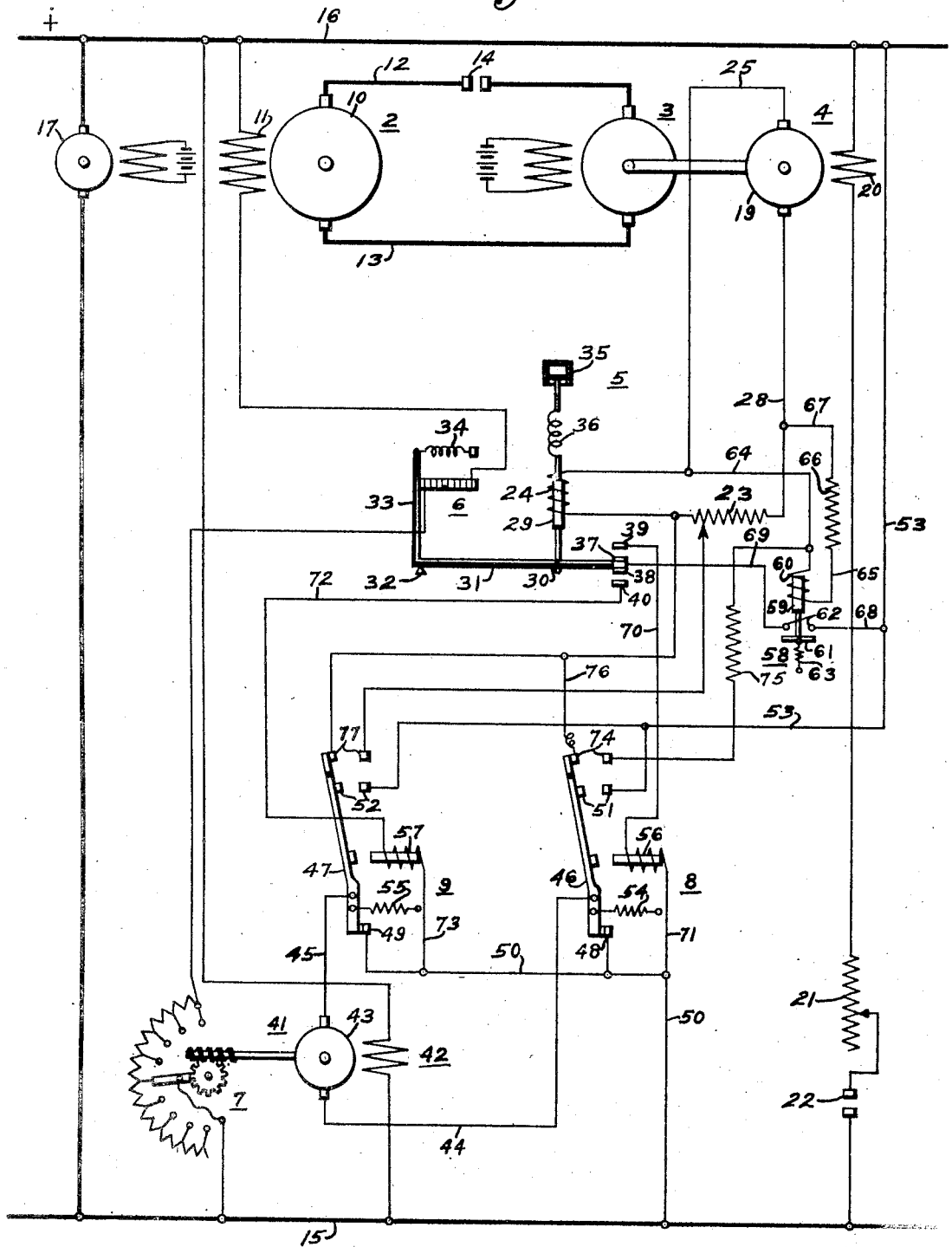
Figure 1 is a schematic view of apparatus and circuits illustrating one embodiment of my invention.

Referring to Fig. 1 of the drawings, a generator 2 is provided with an armature winding 10 and a field winding 11. The armature winding 10 and a field winding 11. The armature winding 10 is connected by conductors 12 and 13, and a circuit interrupter 14, to the armature of the motor 3 and supplies energy thereto. The field winding 11 is energized from supply conductors 15, 16 that are connected to an exciter generator 17, through a circuit leading from the supply conductor 16, through the field winding 11, the carbon-pile rheostat 6, a motor operated rheostat 7 to the direct-current supply conductor 15.

The pilot generator 4 is connected to be driven in accordance with the speed of the motor 3, and is provided with an armature winding 19 that is connected by conductors 25 and 28 to a winding 24 of the regulator 5, and with a field winding 20, that is connected through an adjustable rheostat 21 and a circuit interrupter 22 to the supply conductors 15 and 16.

The regulator 5 comprises a bell-crank lever 31—33 pivotally mounted at 32, and a biasing member 34 for biasing the lever in a direction to apply pressure to the carbon-pile 6. A core member 29 that is actuated by the winding 24 is connected to the lever 31 at the pivot point 30, and is also connected to an anti-hunting dash-pot 35 through a resilient member 36.

The arm 31 of the bell crank lever carries movable contact members 37 and 38 which cooperate, respectively, with stationary contact members 39 and 40 to close circuits for energizing the one or the other of the reversing switches 8 and 9 to operate the motor 41 and the rheostat 7, in the one or the other direction. The rheostat 7 is operated by a pilot motor 41 which is provided with a field winding 42 that is connected to the supply conductors 15 and 16, and with an armature winding 43 that is connected by means of conductors 44 and 45 to movable contact arms 46 and 47, respectively, of the reversing switches 8 and 9.

When the reversing switches 8 and 9 are deenergized and stand in the positions illustrated, a circuit from the armature winding of the pilot motor 41 is completed through cooperating pairs of contact members 48 and 49 of the reversing switches 8 and 9, respectively, and the conductor 50, thus forming a closed or dynamic braking circuit for the pilot motor. The stationary contact members 48 and 49 are connected by means of the conductor 50 to one of the direct-current supply conductors 15.

The stationary members of similar pairs of contact members 51 and 52 are connected by means of a conductor 53 to the supply conductor 16, and are adapted to connect one side of the pilot motor armature winding to the supply conductor 16 upon the operation of the one or the other of the reversing switches 8 and 9 to its second operative position.

The reversing switches 8 and 9 are provided with biasing members 54 and 55, respectively, for normally biasing the switches to their illustrated or dynamic braking positions and with electromagnets 56 and 57, respectively, that are energized in accordance with the operation of the regulator 5.

In order to avoid the possibility of the reversing switches 8 and 9 operating while the motor 3 is idle, the supply circuit for the electromagnets 56 and 57 is completed through the engaged contact members of a relay 58, comprising a movable armature 59 and an operating coil 60. The movable armature 59 carried a contact member 61 that is adapted to engage stationary contact members 62. The movable contact arm of the relay is normally biased downwardly against the pull of the winding 60 by means of a spring member 63. The supply circuit for the winding 60 is connected in shunt relation to the operating coil 24 of the regulator 5, and may be traced from one side of the pilot-generator 4, through conductor 25, conductor 64, operating coil 60, conductor 65, a resistor 66, conductor 67 and conductor 28 to the other side of the pilot-generator 4. When the generator 4 is energized, the movable armature 59 is pulled upwardly against the pull of the spring 63, thereby causing the movable contact member 61 to engage the stationary contact member 62.

Upon engagement of the contact members 37 and 39, a circuit is completed from the supply conductor 16 through conductor 53, conductor 68, the contact members 61 and 62, conductor 69, the contact members 37 and 39, conductor 70, the operating coil of the electro-magnet 56 of the reversing switch 8, conductor 71 and conductor 50 to the supply conductor 15. Upon engagement of the contact members 38 and 40, a circuit is completed from the supply conductor 16 through conductor 53, conductor 68, the contact members 61 and 62, conductor 69, the contact members 38 and 40, conductor 72, the operating coil of the electro-magnet 57 of the reversing switch 9, conductor 73 and conductor 50 to the supply conductor 15.

The operation of the system illustrated in Fig. 1 is as follows:

If the speed of the motor 3 rises above the desired value, the speed of the pilot generator 4 will be increased by the same amount and the voltage generated by the pilot generator will increase. A greater voltage being impressed upon the operating winding 24 of the regulator 5, the core member 29 is actuated upwardly, thus causing the arm 33 to overcome the pull of the spring 34 and reduce the pressure on the carbon discs, thereby increasing the resistance of the circuit of the field winding 11 and reducing the excitation of generator 2. The decrease in field excitation of generator 2 results in a lower voltage being generated by generator 2 and impressed on motor 3, thereby reducing its speed.

As the core member 29 is actuated upwardly to change the pressure on the carbon discs and thereby the excitation of generator 2, it is necessary to prevent overtravel of the core member 29 to prevent the correction in the field excitation of the generator from varying beyond or overshooting its desired value. This is accomplished by means of the dash pot 35 and the biasing connection between the piston of the dash pot and the core member 29. Because of the connection of the biasing member 36 between the dash pot piston and the core member 29, the core is permitted to immediately travel the greater part of the distance corresponding to the change in the excitation of the core 24, and as the compression on the biasing member increases, the dash pot piston is actuated and gradually follows the movement of the core member 29. It follows that the action of the regulator, while prompt in its reaction to a change in the voltage impressed on the operating winding 24, approaches its new position gradually. That is to say, the first part of the movement of the core member 29 is rapid and the latter part of the movement is gradual.

If the increase in speed of motor 3 is such that the regulation required is beyond the range of the carbon pile rheostat, the increase in the excitation of the regulator 5 will be of such magnitude as to actuate the armature 29 upwardly sufficiently to cause engagement of the contact members 37 and 39 thus effecting the energization of the electro-magnet 56 of the reversing switch 8 through the circuit traced above. The reversing switch 8 is thus actuated to a second operative position, thus separating the pair of contact members 48 and causing engagement of the cooperating pairs of contact members 51 and 74. A circuit through the armature winding 43 of the pilot motor 41 is now completed from the supply conductor 15 through conductor 50, the contact members 49 of reversing switch 9, the movable contact arm 47, conductor 45, armature winding 43, conductor 44, the movable contact arm 46, contact members 51 of the reversing switch 8 and conductor 53 to the supply conductor 16, thus causing the pilot motor to operate the rheostat in a direction to increase the resistance in circuit with the field winding 11 and thereby decrease the voltage of generator 2 and the speed of motor 3.

Engagement of contact members 74 completes a circuit through the resistor 75 and conductor 76 in shunt relation to the winding 24 of the electromagnet 5, thus decreasing the energization of the winding 24 and hastening the disengagement of the contact members 37 and 39 to prevent the rheostat from hunting. When the speed of the motor 3 is decreased to substantially the desired value, the contact members 37 and 39 will be disengaged and the reversing switch 8 will return to its illustrated position to complete the dynamic braking circuit for the pilot motor 41 through the contact members 48 thus promptly stopping the pilot motor.

If the speed of motor 3 decreased below its desired value, the action of the spring 34 will overcome the pull of the winding 24 and the bell crank lever will rotate about the pivot 32, in a clockwise direction, forcing the arm 33 against the carbon discs and decreasing the resistance in the circuit of the field winding, thereby increasing the excitation of generator 2. This increase in the excitation of the generator 2 causes an increase in the voltage generated thereby and impressed upon motor 3, thus increasing its speed.

The decrease in speed of motor 3 may be such that the correction required is beyond the range of the carbon-pile rheostat. In that event the energization of the electro-magnet 5 will decrease sufficiently so that the pull of the spring 34 will cause the core member 29 to move downwardly and cause engagement of the contact members 38 and 40, thus completing a circuit through the operating winding 57 of reversing switch 9, as traced above, and causing the switch 9 to be actuated to its second operative position. Upon operation of the reversing switch 9 to its second operative position, the pair of cooperating contact members 49 are disengaged and the pairs of cooperating contact members 52 and 77 are brought into engagement.

A circuit is completed through the armature winding 43 of the pilot motor 41 in the opposite direction from that completed upon the operation of the switch 8, as described above. This circuit may be traced from the direct-current supply conductor 15 through conductor 50, contact members 48 of the reversing switch 8, the movable contact arm 46, conductor 44, armature winding 43, conductor 45, the movable contact arm 47, contact members 52 of the reversing switch 9 and conductor 53 to the supply conductor 16. The pilot motor 41 is, therefore, caused to operate in the reversed direction and to actuate the rheostat 7 in such a direction as to further decrease the resistance in the field winding circuit, thereby increasing the excitation of generator 2. The excitation being greater, the voltage generated by generator 2 and impressed upon motor 3 will be greater and its speed will be increased.

In the second operative position of the reversing switch 9, the contact members 77 are in engagement to cause a portion of the resistor 23 to be excluded from the circuit of the winding 24, thus increasing the energization thereof slightly and hastening the separation of the contact members 38 and 40 and, therefore, preventing the rheostat 7 from hunting.

Figure 2:
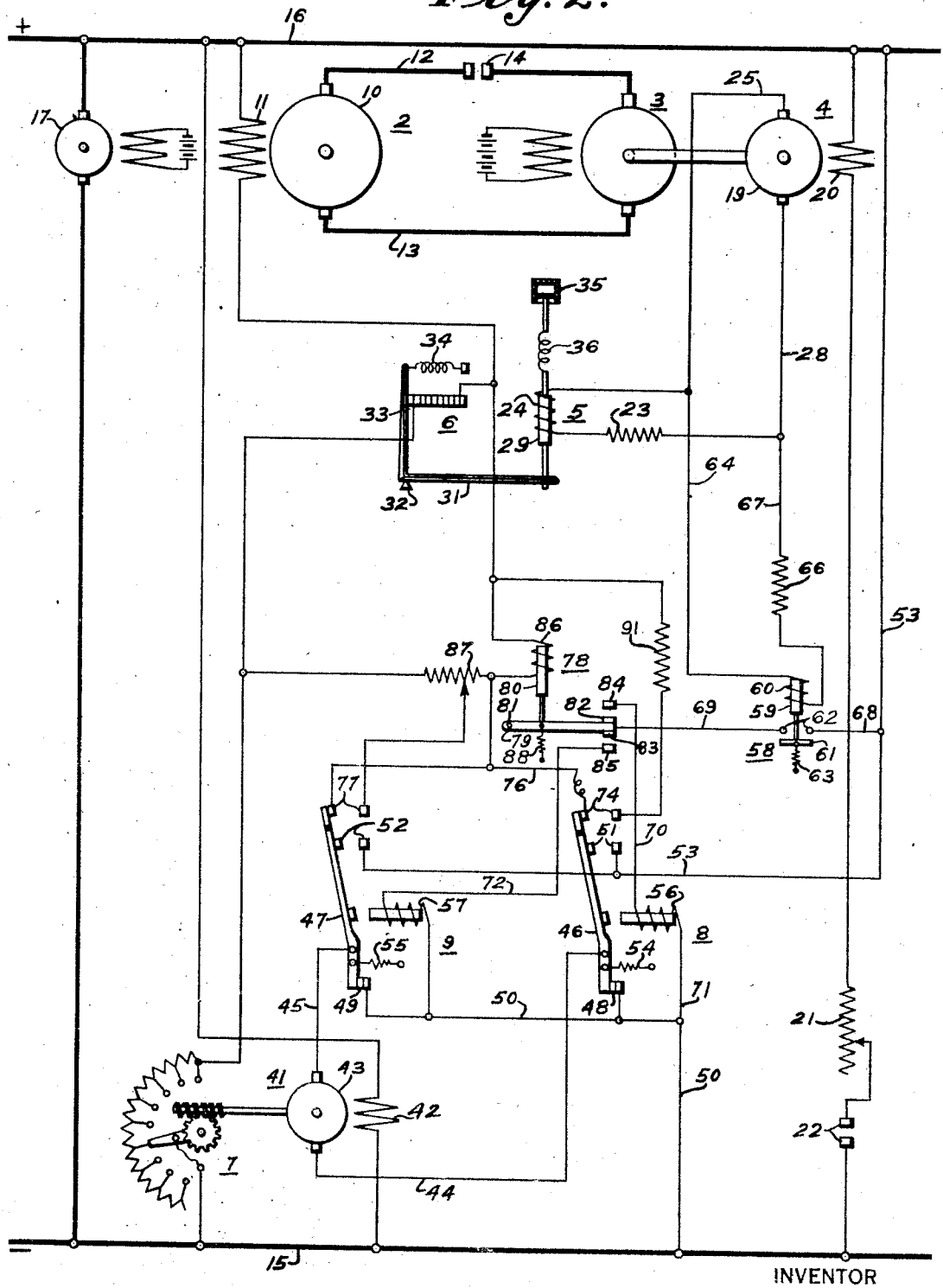
Fig. 2 is a schematic view of apparatus and circuits illustrating another embodiment of my invention.

In the embodiment of my invention illustrated in Fig. 2, a relay or contact-making voltmeter 78 is provided to control the operation of reversing switches 8 and 9.

The contact-making voltmeter 78 comprises a lever 79 actuated by an electromagnet 80, said lever being pivotally supported at one end 81. The lever 79 carries movable contact members 82 and 83 which cooperate respectively with stationary contact members 84 and 85 to close circuits that energize the reversing switches 8 and 9, respectively. The electromagnet 80 is provided with an operating winding 86 that is connected in shunt relation to the carbon-pile rheostat 6 through a resistor 87. A biasing member 88 is provided to oppose the upward pull of the winding 86.

The operation of the embodiment of my invention illustrated in Fig. 2 is as follows:

The operation of the carbon-pile rheostat is the same as that described above for the embodiment illustrated in Fig. 1. The excitation of the electromagnet 80, produced by the winding 86 is proportional to the voltage drop across the rheostat 6, and when the speed of the motor 3 is such that the carbon-pile rheostat is operating within its normal range, will be sufficient to hold the lever arm 79 in a neutral position.

If the increase in speed of motor 3 is material, the excitation of the operating winding 24 will overcome the action of the spring 34 and release the pressure exerted by the arm 33 on the carbon discs. The decrease in pressure on the carbon discs increases the resistance of the carbon pile thus increasing the voltage drop through the operating winding 86 of the electromagnet 80 sufficiently to cause the lever 79 to move upwardly effecting engagement of the contact members 82 and 84, thereby actuating the reversing switch 8 to its second operative position. When the reversing switch 8 is in its second operative position, the pilot motor 41 operates the rheostat 7 in the manner hereinbefore described to increase the resistance in circuit with the field winding 11 and thereby decrease the voltage of generator 2 and the speed of motor 3.

If the speed of motor 3 falls considerably, the excitation of the regulator 5 is materially reduced and the action of the spring 34 causes the arm 33 to increase the pressure on the carbon discs. The increased pressure reduces the resistance of the carbon pile thus decreasing the voltage drop across the resistor 6 and the operating winding 86 of the electromagnet 80. The excitation of the electromagnet 80 being greatly reduced, the biasing member 88 will pull the lever 79 downwardly and cause engagement of the contact members 83 and 85 thereby actuating the reversing switch 9 to its second operating position. The actuation of reversing switch 9 causes the pilot motor 41 to operate the rheostat 7 in a manner described hereinbefore to decrease the resistance in circuit with the field winding 11 and thereby increase the voltage of generator 2 and the speed of motor 3.

Resistors 91 and 87 utilized to prevent hunting of the regulator are connected in shunt relation and series circuit relation respectively with the operating winding 86. The manner in which these resistors are utilized for the purpose of anti-hunting is similar to that described hereinbefore for the embodiment illustrated in Fig. 1.

Figure 3:
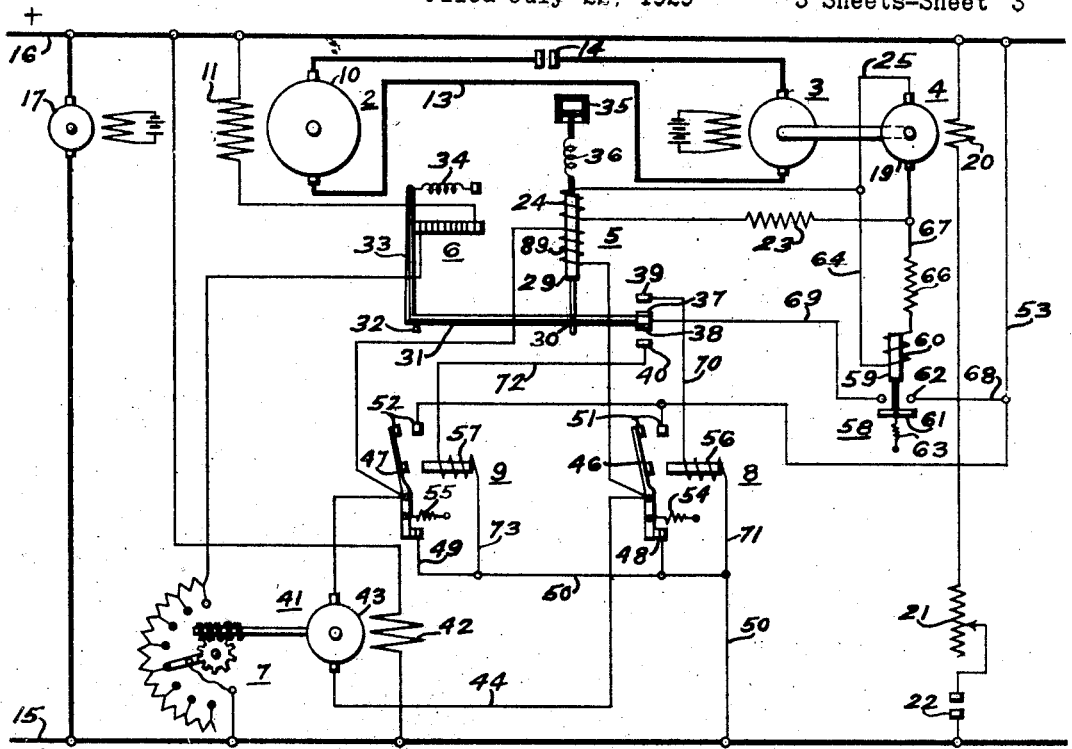
Fig. 3 is a schematic view of apparatus and circuits similar to the embodiment illustrated in Fig. 1, but employing different anti-hunting means.

In Fig. 3 there is illustrated another embodiment of my invention for preventing the regulator from hunting. The resistor 75 and the shunting connection of resistor 23 utilized in the embodiment illustrated in Fig. 1 have been eliminated and an auxiliary winding 89 is disposed on the core member 29 of the regulator 5. The winding 89 is connected across the terminals of the pilot motor 41 and is energized whenever the motor 41 is energized and its direction depends upon the operation of the reversing switches 8 and 9. When the reversing switch 8 is in its second operative position, the energization of winding 89 will be opposite to that of winding 24 and will tend to make the armature 24 return to its normal position and hasten the disengagement of contact members 37 and 39.

When the reversing switch 9 is in its second operative position, the energization of winding 89 is in the same direction as winding 24 and its excitation together with that produced by winding 24 tends to make the arm 31 return to its normal position and hastens the disengagement of the contact members 38 and 40.

Figure 4:
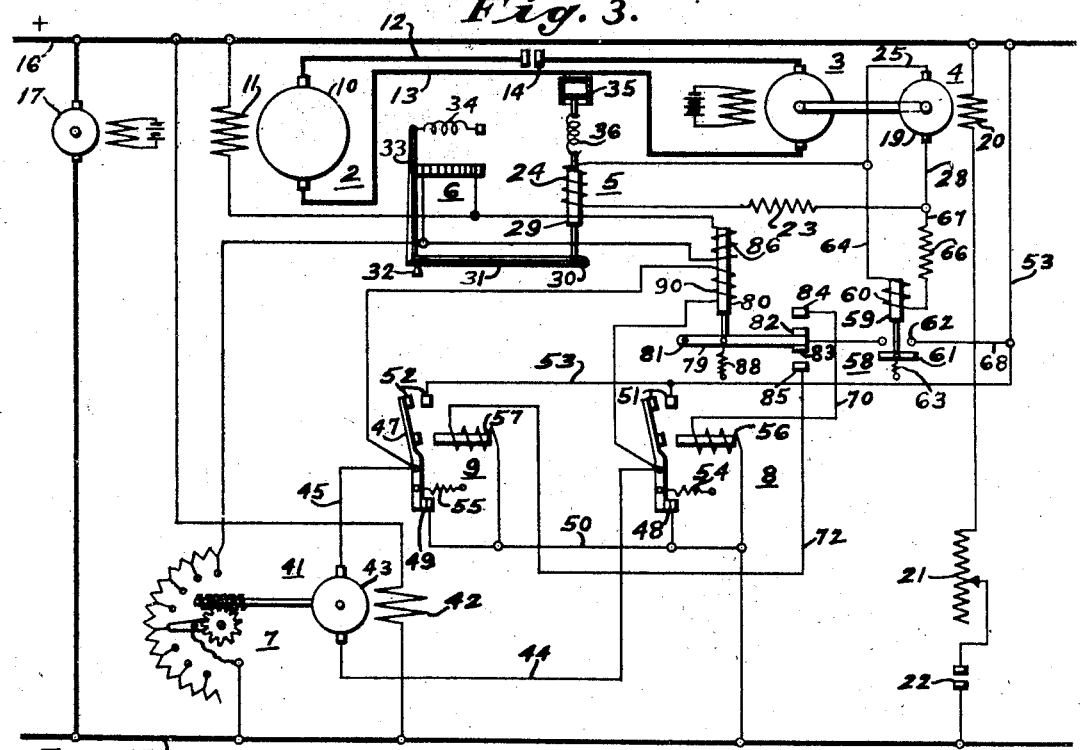
Fig. 4 is a schematic view of apparatus and circuits similar to the embodiment illustrated in Fig. 2, but employing different anti-hunting means.

In Fig. 4 there is illustrated another form of my invention which differs from the embodiment illustrated in Fig. 2 by providing a different means to prevent the regulator from hunting. The resistors 91 and 87 used for anti-hunting in Fig. 2 are eliminated and an auxiliary winding 90 is disposed on the armature of the electromagnet 80. The winding 90 opposes and coacts with the winding 86 in a manner similar to the action of the windings 24 and 87 of Fig. 3 to prevent hunting of the regulator.

Since many modifications in the apparatus and arrangements of circuits may be made without departing from the spirit and scope of my invention I do not wish to be limited otherwise than by the scope of the appended claims.

I claim as my invention:

1. In a regulator system, a dynamo-electric machine having a field winding, a variable pressure rheostat and an auxiliary rheostat connected in circuit with said field winding, a regulator actuated in accordance with variations in a regulated quantity of said system for operating said variable pressure rheostat, means actuated upon the approach of said variable pressure rheostat to the end of its range of operation for operating said auxiliary rheostat in a direction to increase the range of regulation of said system and means for preventing the operation of said auxiliary rheostat when the dynamo-electric machine is unenergized.

2. In a regulator system, a dynamo-electric machine having a field winding, a variable pressure rheostat and an auxiliary rheostat connected in circuit with said field winding, a regulator actuated in accordance with variations in a regulated quantity of said system for operating said variable pressure rheostat, means actuated upon a predetermined variation in the value of said variable pressure rheostat from its mid value for operating said auxiliary rheostat in a direction corresponding to the direction in the variation in value of the pressure rheostat from its mid value, and means for rendering the auxiliary rheostat inoperative when the dynamo-electric machine is not operating.

3. In a regulator system, a dynamo-electric machine having a field winding, a relatively high speed rheostat having a limited range of operation and a relatively low speed rheostat connected in circuit with said field winding, a regulator actuated in accordance with variations in a regulated quantity of said system for initially operating said relatively high speed rheostat, and, upon the approach of said rheostat to a limit of its range of operation, for operating said relatively low speed rheostat to so vary the resistance of said field winding circuit as to maintain said relatively high speed rheostat within its range of operation.

4. In a regulator system, a motor, a generator for supplying energy to said motor and having a field winding, means for controlling the excitation of said generator to govern the speed of said motor, said controlling means comprising two variable resistors connected in circuit with said field winding, regulator means for operating one of said resistors in accordance with the speed of said motor, means actuated by said regulator means for operating the other variable resistor after the first named resistor is varied a predetermined amount and means rendering the operation of the second named variable resistor dependent upon the operation of said motor.

5. In a speed regulator system, a motor, a generator having a field winding and supplying energy to said motor, means for regulating the excitation of said generator to control the speed of said motor, said regulating means comprising a carbon-pile rheostat and a variable resistor connected in series circuit relation with said field winding and with each other, means for operating said carbon-pile rheostat, anti-hunting means associated therewith, said operating means actuating means operable to gradually actuate said variable resistor after a predetermined variation of the carbon-pile rheostat, anti-hunting means associated therewith and means rendering the variable rheostat inoperable while the motor is idle.

6. In a regulator system, a motor, a generator comprising a field winding, said motor being supplied with energy from said generator, means for controlling the excitation of said generator to govern the speed of said motor comprising two variable resistors connected in circuit with said field winding, a pilot generator driven by said motor, an electromagnet actuated in accordance with an electrical quantity of said pilot generator, to vary the value of one resistor and to actuate means to operate the other variable resistor after a predetermined variation in the resistance of the first-named resistor and anti-hunting means associated with the operating means of both resistors.

7. In a regulator system, a motor, a generator comprising a field winding, said motor being supplied with energy from said generator, means for controlling the excitation of said generator to govern the speed of said motor, comprising a carbon-pile rheostat and a variable resistor connected in series-circuit relation with said field winding, a pilot generator driven by said motor, means actuated in accordance with an electrical characteristic of the pilot generator for operating said carbon-pile rheostat and means for actuating the variable resistor in accordance with the resistance of the carbon-pile, anti-hunting means associated with the operating means for each resistor, and means for rendering the variable resistor actuating means ineffective during the inoperative period of said motor.

8. In a regulator system, a motor, means for controlling the speed of said motor comprising a field winding and two variable resistors connected in circuit with said field winding, a pilot generator driven by said motor, a regulator having an operating coil energized in accordance with an electrical quantity of said pilot generator for controlling the value of one resistor, and means actuated by said regulator upon a predetermined variation in the energization of said coil from a desired value for operating the other of said variable resistors, anti-hunting means associated therewith and means for rendering said regulator actuated means inoperable when the motor is not in operation.

In testimony whereof, I have hereunto subscribed my name this 16th day of July, 1929.

JOHN H. ASHBAUGH.